(12) United States Patent
Bartus et al.

(10) Patent No.: US 11,994,190 B2
(45) Date of Patent: May 28, 2024

(54) LINEAR DRIVE WITH CONTROL HOUSING

(71) Applicant: DewertOkin KFT, Kecskemét (HU)

(72) Inventors: Péter Bartus, Tiszaalpár (HU); Zsolt Mojzes, Nagybaracska (HU)

(73) Assignee: DEWERTOKIN KFT, Kecskemet (HU)

( * ) Notice: Subject to any disclaimer, the term of this patent is extended or adjusted under 35 U.S.C. 154(b) by 34 days.

(21) Appl. No.: 17/757,497

(22) PCT Filed: Dec. 14, 2020

(86) PCT No.: PCT/EP2020/085923
§ 371 (c)(1),
(2) Date: Jun. 16, 2022

(87) PCT Pub. No.: WO2021/122426
PCT Pub. Date: Jun. 24, 2021

(65) Prior Publication Data
US 2023/0019885 A1 Jan. 19, 2023

(30) Foreign Application Priority Data
Dec. 17, 2019 (DE) .................... 20 2019 107 037.4

(51) Int. Cl.
F16H 25/20 (2006.01)
H02K 7/116 (2006.01)
(Continued)

(52) U.S. Cl.
CPC ............ F16H 25/20 (2013.01); H02K 7/116 (2013.01); H02K 11/30 (2016.01); H02K 41/02 (2013.01);
(Continued)

(58) Field of Classification Search
CPC .... F16H 2025/2481; F16H 2025/2034; H02K 11/33
See application file for complete search history.

(56) References Cited

U.S. PATENT DOCUMENTS 6,975,508 B2    12/2005  Hoegener et al.
9,391,490 B2 *   7/2016  Knudsen .................. H02K 7/06
                        (Continued)

FOREIGN PATENT DOCUMENTS

DE    102010062727    6/2012
EP         1404170    3/2004
WO      2019/091997    5/2019

OTHER PUBLICATIONS

Office Action from related Korean Appln. No. 10-2019-7020929, dated Jan. 6, 2023. English translation attached.
(Continued)

Primary Examiner — Gregory Robert Weber
(74) Attorney, Agent, or Firm — Grossman, Tucker, Perreault & Pfleger, PLLC

(57) ABSTRACT

Linear drive with a gear housing extending along a longitudinal axis, in which a spindle is rotatably mounted with a worm wheel connected to it in a rotationally fixed manner, a spindle nut running on the spindle, which is adjustable on the spindle between a retracted position and an extended position and which acts on a lifting tube. The spindle nut is arranged in the retracted position guide tube and retracted in the region of a rear end of the guide tube, and thus the lifting tube is also retracted into the guide tube. The spindle nut is arranged at a front end of the guide tube in the extended position. An electric motor drives the screw, which extends along a transverse axis extending transversely to the longitudinal axis, wherein the electric motor is accommodated in a motor housing which is connected to the gear housing. Furthermore, a control system is arranged in a control (Continued)

housing. In order to simplify the assembly of the control housing, a connection is formed between the control housing and the drive housing, which is designed in such a way that the latter is simultaneously electrically connected to the drive housing during the mechanical attachment.

6 Claims, 2 Drawing Sheets

(51) Int. Cl.
*H02K 11/30* (2016.01)
*H02K 41/02* (2006.01)

(52) U.S. Cl.
CPC ............... *F16H 2025/2031* (2013.01); *F16H 2025/209* (2013.01)

(56) References Cited

U.S. PATENT DOCUMENTS

| | | | |
|---|---|---|---|
| 10,270,313 B2* | 4/2019 | Jørgensen | F16H 25/20 |
| 2013/0313907 A1* | 11/2013 | Wu | H01M 10/48 |
| | | | 307/66 |
| 2017/0324301 A1 | 11/2017 | Jorgensen | |
| 2018/0266530 A1 | 9/2018 | Alfano et al. | |

OTHER PUBLICATIONS

International Preliminary Report on Patentability from corresponding PCT Appln. No. PCT/EP2020/085923, dated May 17, 2022. 8 pages.
International Search Report from corresponding PCT Appln. No. PCT/EP2020/085923, dated Mar. 16, 2021.

* cited by examiner

LINEAR DRIVE WITH CONTROL HOUSING

FIELD

The invention relates to a linear drive with a gear housing extending along a longitudinal axis, in which a spindle extending along the longitudinal axis is rotatably mounted with a worm wheel connected to it in a rotationally fixed manner, a spindle nut running on the spindle, which is adjustable on the spindle between a retracted position and an extended position, wherein the spindle nut in the retracted position is arranged retracted in a stationary guide tube receiving the spindle nut in the region of a rear end of the guide tube and thus the lifting tube is retracted into the guide tube, wherein the spindle nut in the extended position is arranged at a front end of the guide tube and thus the lifting tube is extended from the guide tube, a worm driven by an electric motor, extending along a transverse axis extending transversely to the longitudinal axis, meshing the worm wheel, and wherein the electric motor is accommodated in a motor housing connected to the gear housing, and a control system for the linear drive arranged in a control housing.

BACKGROUND

The control housing contains circuit boards and other electronic components for controlling the motor to correctly position the lifting tube relative to the stationary guide tube in order to drive a piece of furniture driven by the linear drive, such as an armchair or hospital bed for adjusting the footrest and headrest.

Disadvantages of the Prior Art

The control housing is mounted at various points on the piece of furniture, frequently on the side of the bed frame on a hospital bed or also underneath the lying surface. For this purpose, the control housing must first be installed with the piece of furniture or bed or the like and then an electrical contact with the linear drive must be realized, for which purpose a cable is usually routed from the control housing to the linear drive, in particular connected to the gear housing. This assembly of the control housing is relatively time-consuming and therefore cost-intensive.

Object/Technical Problem

Based on this prior art and the associated disadvantages, the invention is thus based on the object/technical problem of at least partially avoiding these disadvantages and, in particular, implementing easy and fast reliable assembly of the control housing.

SUMMARY

According to the invention, this technical problem is already solved by the features of the independent claims. Advantageous, but therefore not mandatory, further developments are given in the dependent claims.

In the simplest embodiment, this object is thus solved in that the control housing comprises a fastening system which, when mechanically fastened to the drive housing, simultaneously realizes the electrical and/or data connection to the drive housing in the installation position.

The control housing is preferably connected only to the gear housing, but in principle it can also be connected to the motor housing or to the gear housing and the motor housing, i.e., the drive housing.

The fastening system is preferably designed in such a way that only a translatory movement of the control housing in relation to the gear housing is required during assembly, i.e. a sliding or insertion of the control housing with an insertion section into a receiving section of the complementary other mating partner or vice versa, in order to transfer the control housing into the desired end position, in which the connector is not only mechanically fixed, but also the electronic and/or data connection is realized.

Thus, according to the invention, separate mounting of the control housing on the piece of furniture is no longer required, nor is it necessary to lay a cable from the control housing to the linear drive, in particular the gear housing, and connect it to the latter.

Preferably, the mechanical connection or mechanical fastening is designed to be very robust, so that the mechanical connection is only made in conjunction with the electrical connection.

Preferably, the connection technology is designed in such a way that during joining, i.e., the process of plugging together, a ground contact is made, preferably before further electrical contact is made with the other contacts. This can be done, for example, by the ground contact protruding from the other contacts. This can be done by also providing an additional electrical ground contact during the mechanical contacting.

In the preferred embodiment, the control housing comprises a first and a second housing wall which enclose between them a wall angle which is preferably a right angle or an acute angle, in that an insertion system is formed between the first housing wall and the gear housing adjacent to the latter in the installed position, and in that a connector system is formed between the second housing wall and the gear housing wall adjacent to the latter. Only in the final installation position, i.e., when the control housing is fully inserted into the insertion system, is the electrical and/or data connection made via the connector system.

This corner connection between the drive housing and the control housing, which is implemented in this way, provides a particularly robust fixation, which is therefore particularly stable against forces and thus very good at preventing unwanted breakage of the control housing.

Particularly preferably, the insertion system is designed as a linear guide system, which thus realizes a positive connection between the mating partners in such a way that only a translatory relative movement between the gear housing and the control housing is possible.

In embodiments, the design of the insertion system/linear guide system provides for a dovetail guide formed between the mating partners.

The connector system preferably comprises a plug on one mating partner and a complementary socket on the other mating partner, into which the plug is inserted after the translational movement has been executed in the end position.

The connector system can also include a union nut which is screwed over the connection point between plug and socket in the installation position after the plug has been engaged in the sockets, in order to fix the two mating partners in the desired installation position and to realize good contacting of the connector system. In abstract terms, this is a sealing of the connection point of the connector system against the ingress of dust and/or moisture.

In a preferred embodiment, the connector system or the plug or even the socket is located very close to the circuit board so that the contacts are close to the circuit board, which means an increase in stability for the assembly and the applied pressure during linear displacement. Preferably, the contacts are designed to electrically connect the circuit boards to each other.

Preferably, the contacts themselves are permanently connected to the respective circuit board.

In one embodiment, the aforementioned connection comprises only the connector system.

According to a further embodiment, the connection comprises both the connector system and the insertion system. This has the advantage that an improved and more robust connection is provided for large and particularly heavy control housings.

Preferably, the control housing is fixed to the actuator, especially preferably to the gear housing, by means of a plug union nut. However, this union nut is optional. It is therefore essential that the control housing is displaced in relation to the drive housing, i.e., the housing of the linear drive, during fixing in such a way that the two parts are mechanically inserted into the guide system in the installation position and the connector system is mechanically and electrically connected. In the preferred embodiment, the two housing walls of the control housing are at a right angle to each other and engage the respective mating partners on the drive housing or gear housing, particularly preferably in the area of the receptacle for the hollow cylindrical gear housing on the drive housing, which is arranged in an area in which a right angle extends between the receptacle area of the drive housing for the gear housing and the area extending at right angles thereto along the longitudinal axis for the receptacle of the gear with the spindle and the worm wheel.

The connector system is preferably designed to realize the power supply separately from the data supply.

Preferably, the plug includes a first power supply connector part and a second data supply connector part. The power supply connector part in turn has two sections, namely a section for the positive pole and a section for the negative pole, which correspond to corresponding sections within the socket. The data supply connector part implements the data supply for the signal line and for the sensor system. Preferably, a bus system is used for data transmission.

In this respect, the control system or the control board installed in the control housing is completely bus-capable, in particular with a 2-wire differential bus. The drive sends or receives data for lifting tube control, speed control and synchronous operation.

Preferably, both connector parts are IP protected by tightening the union nut, i.e., protected against water ingress. IP protected means that protection against dust and moisture is realized according to different requirements.

Preferably, the connector system is designed to be as flat as possible in order to thus ensure that the control housing is as close as possible to the gear housing and thus to prevent, as far as possible, the penetration of objects that cause the control housing to break off.

A further embodiment provides that linear guide means are also or only formed in the connector system, e.g., two projections which cooperate with complementary recesses on the other mating partner during joining, thus ensuring the correct positional alignment of the mating partners relative to one another in the installed position.

Further features and advantages of the present invention will become apparent from the following figure description of preferred embodiments with reference to the accompanying figures.

In this regard, directional terminology such as "top," "bottom," "front," "rear," "front," "rear," etc. is used in reference to the orientation of the figure(s) described. Since components of embodiments may be positioned in a number of different orientations, the directional terminology is for illustrative purposes and is not limiting in any way. It is understood that other embodiments may be used and structural or logical changes may be made without departing from the scope of protection of the present invention. The following detailed description is not to be construed in a limiting sense.

In the context of this description, the terms "connected", "linked" as well as "integrated" are used to describe both a direct and an indirect connection, a direct or indirect linkage as well as a direct or indirect integration. In the figures, identical or similar elements are given identical reference signs where appropriate. The representations in the figures are essentially to scale. However, in order to illustrate details, certain areas may be shown in an exaggerated size recognizable to those skilled in the art. In addition, the drawings may be strikingly simplified and do not include every detail that may be present in the practical embodiment.

Unless otherwise indicated, the indefinite article and definite article refer not only to a single component, but are to be understood as "at least one". The terminology includes the previously mentioned words, variations thereof, and similar meanings. Further, it should be understood that the terms "about," "substantially," and similar terms used in connection with the dimensions and a property of a component of the invention do not describe the described dimension and property as a strict limit or parameter and do not exclude minor variations thereof which are functionally similar. At a minimum, descriptive parts with numerical parameters also include variations of those parameters in accordance with prior art mathematical and manufacturing principles, e.g., rounding, deviations and other systematic errors, manufacturing tolerances, etc.

Finally, in the case of several identical components or elements, only one reference number is given in each case for reasons of clarity. Identical reference numbers in the figures refer to identical components or features.

All features of the respective exemplary embodiments are here independently also generally disclosed within the scope of the invention.

DETAILED DESCRIPTION

Figure 1:
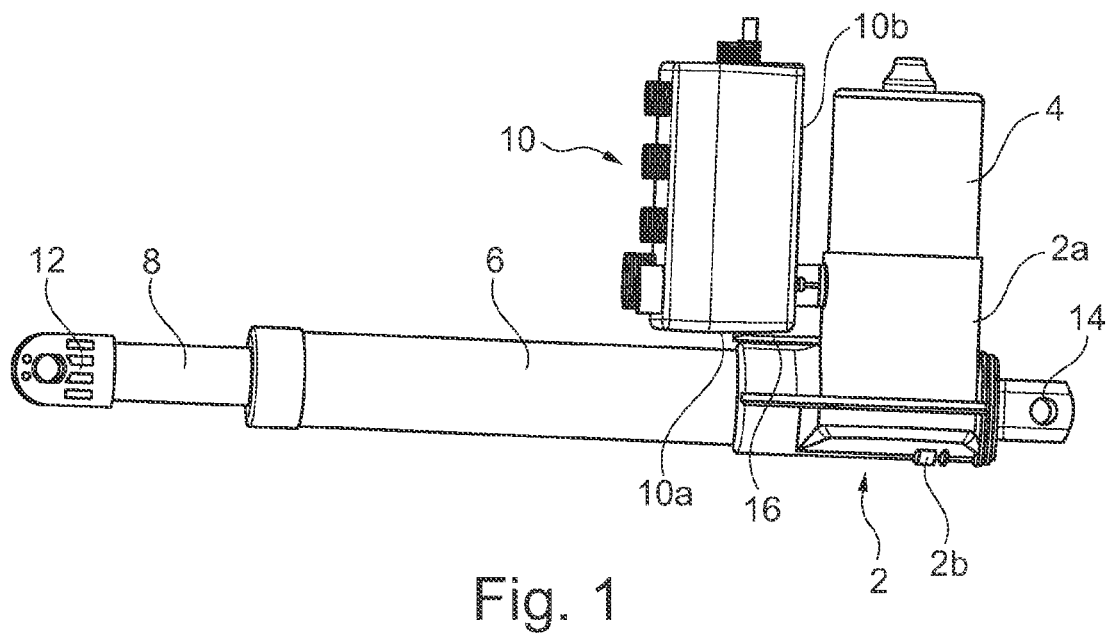
FIG. 1: shows a top view of a linear drive according to the invention.
Figure 2:
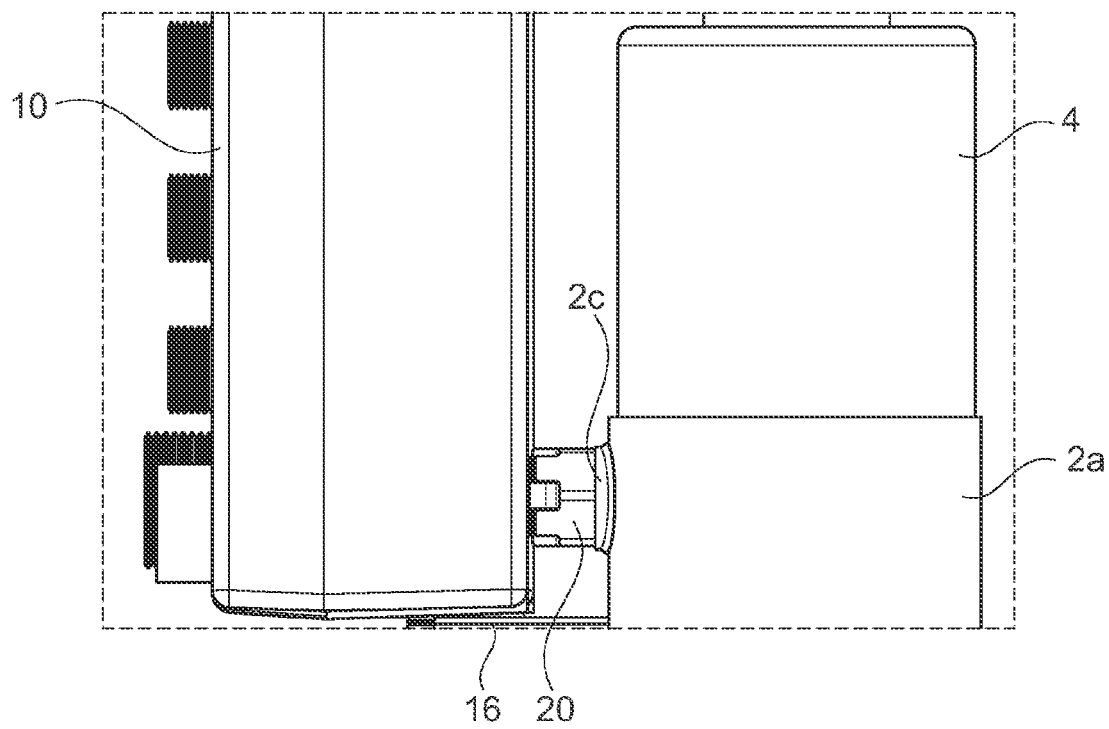
FIG. 2 shows a magnified view of the connection area between the control housing and the gear housing.

FIG. 1 shows a top view of the linear drive according to the invention, essentially comprising a gear housing 2, a motor housing 4 accommodated therein, a guide tube 6 with a lifting tube 8 movable therein relatively in the longitudinal direction, and a control housing 10 connected to the drive.

The guide tube 6 and the lifting tube 8 arranged therein so as to be relatively movable define the longitudinal axis X of the linear drive. The motor housing 4 extends transversely to this longitudinal direction in a transverse direction Y.

The gear housing 2 is formed in two parts with a rear housing part 2a and a housing cover 2b connected to the latter, which are joined together in a sealing manner at the joint.

Inside the gear housing 2, the worm wheel is accommodated, which is seated in a rotationally fixed manner on a spindle that drives a spindle nut, which in turn is connected to the rear end of the lifting tube 8 arranged in the guide tube 6. A front clevis 12 is seated on the front end of the lifting tube 8. At the rear end of the gear housing 2, which is opposite the end for accommodating the guide tube 6, a rear clevis 14 is inserted into the gear housing 2. The devises 12, 14 can be connected in a known manner to shafts of furniture, so that the furniture or furniture components can be adjusted in relation to each other. Such a linear drive or drive is particularly preferred for adjusting head and foot sections of hospital beds. Other areas of application are patient lifts, treatment couches, dentist's chairs and the like.

The rear housing part 2a comprises a circular-cylindrical receiving socket of corresponding size, into which a complementary hollow-cylindrical socket of the motor housing 4 or alternatively of the gear housing 2 is inserted, which receives the electric motor rotatably along the rotor longitudinal axis extending transversely to the longitudinal direction.

A worm at the front end of the rotor shaft drives the worm wheel for the variable speed drive inside the gear housing 2.

This electric motor is controlled by the control electronics housed in the control housing 10.

The control housing is also formed as a substantially rectangular plastic housing, which has a greater length than width and height. The control housing 10 is substantially box-shaped, formed as a rectangular box, which has at least two housing walls 10a, 10b standing at a housing angle of 90° to each other, wherein a shorter housing end wall 10a is fixed to the receiving section of the transmission housing 2 for the guide tube 6, which extends along the longitudinal direction of the drive. On this receiving section, mutually spaced insertion legs of a linear guide/insertion system are formed, into which a corresponding insertion section on the housing end wall 10a of the control housing 10 can be inserted in the longitudinal direction, so that during insertion the correct alignment of the control housing 10 in relation to the gear housing 2 is realized, i.e. only in the correct alignment does the mating between control housing 10 and gear housing 2 become possible.

The control housing 10 is pushed onto the gear housing 2 in the longitudinal direction relative to the latter until the plug 18 of the connector system provided on the housing longitudinal wall 10b engages in the socket 2c formed at the corresponding location on the gear housing 2 and the union nut 20 can then be tightened, in order to draw the control housing 10 into the final mounting position on the gear housing 2 and to fix it in the mounting position in such a way that the electrical and data connection between the control housing 10 and the gear housing 2 is realized at the same time.

Furthermore, however, the insertion system can have at least one insertion leg and/or insertion section designed in the manner of a dovetail guide.

Figure 3:
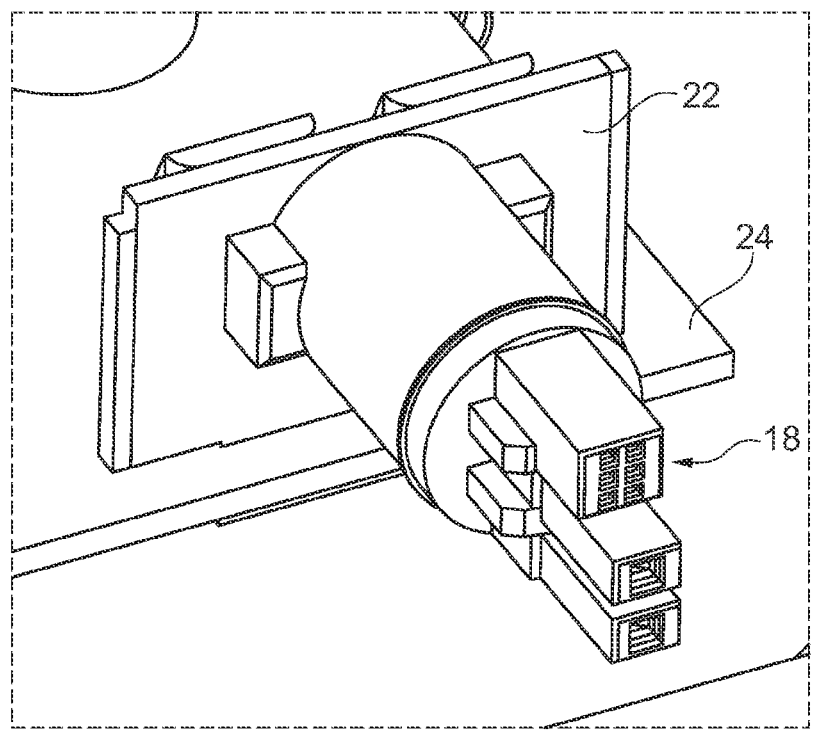
FIG. 3 shows an enlarged isometric front view of the control board connector with the control housing removed.

In this context, the plug 18 shown enlarged in FIG. 3 is inserted into the socket 2c. The plug 18 is arranged on a plug plate 22, which is arranged extending transversely on the control board 24 within the control housing 10.

The plug 18 basically comprises two separate connector parts, a first connector part for the power supply and a second connector part for the data supply.

Both connector parts can be designed as individual plugs or as a group of plugs. Furthermore, individual plugs can also have several plug contacts. Furthermore, a plug contact which is designed as a ground contact or as a shield contact has a longer contact which protrudes with respect to the other contacts and, during the establishment of the electrical connection during plugging together, can be electrically conductively connected as a first plug contact to the complementary other plug contact of the other plug and is thus protruding and thus designed to realize the first contact.

For electrical contacting, the first connector part comprises a positive pole and a separate negative pole, each of which is arranged in the rectangular plug extensions and each of which has an opening at one end for engagement with the complementary mating partner within the socket 2c of the transmission housing 2.

To the side of this first connector part, the second connector part is formed for implementing the data connection between the plug housing 10 and the gear housing 2, which in this case comprises a total of six separate connections in a 2×3 grid on a rectangular end face.

Both connector parts are IP protected by the union nut 20, so like the rest of the drive against water ingress.

List of Reference Signs

2 Gear housing
2 Rear housing part
2b Housing cover
2c Socket
4 Motor housing
6 Guide tube
8 Lifting tube
10 Control housing
10a Housing end wall
10b Housing longitudinal wall
12 Front clevis
14 Rear clevis
16 Linear guide
18 Plug
20 Union nut
22 Plug plate
24 Control board

What is claimed is:
1. A linear drive, comprising:
a gear housing extending along a longitudinal axis, in which a spindle extending along the longitudinal axis is rotatably mounted with a worm wheel connected to it in a rotationally fixed manner, a spindle nut on the spindle, which is adjustable on the spindle between a retracted position and an extended position and which acts on a lifting tube,
wherein the spindle nut in the retracted position is arranged retracted in a stationary guide tube receiving the spindle nut in the region of a rear end of the guide tube and thus the lifting tube is retracted into the guide tube,
wherein the spindle nut is arranged at a front end of the guide tube in the extended position and thus the lifting tube is extended out of the guide tube, a worm driven by an electric motor extending along a transverse axis extending transversely to the longitudinal axis, meshes with the worm wheel,
wherein the electric motor is accommodated in a motor housing which is connected to the gear housing, and a control system arranged in a control housing,
wherein the gear housing and the motor housing form a drive housing,
wherein a connection is formed between the control housing and the drive housing, which is adapted to simultaneously realize an electrical connection when mechanically fastened to the drive housing, wherein the control housing comprises a first and a second housing wall which enclose between them a housing angle, in that an insertion system is formed between the first housing wall and the gear housing adjoining the latter in the installed position, and in that a connector system is formed between the second housing wall and the gear housing adjoining the latter, wherein the connector system comprises a plug on one mating partner and a complementary socket on the other mating partner, wherein the plug comprises two separate connector parts, a first connector part for the power supply and a second connector part for the data supply.

2. The linear drive according to claim 1, wherein the insertion system is designed as a linear guide system.

3. The linear drive according to claim 1, wherein the connector system comprises a union nut.

4. The linear drive according to claim 1, wherein the connection comprises the connector system.

5. The linear drive according to claim 1, wherein the connection comprises the connector system and the insertion system.

6. The linear drive according to claim 1, wherein the insertion system comprises a dovetail guide.

* * * * *